Nov. 15, 1927. 1,649,653
E. R. BENEDICT
METER
Filed Sept. 30. 1924 3 Sheets-Sheet 2

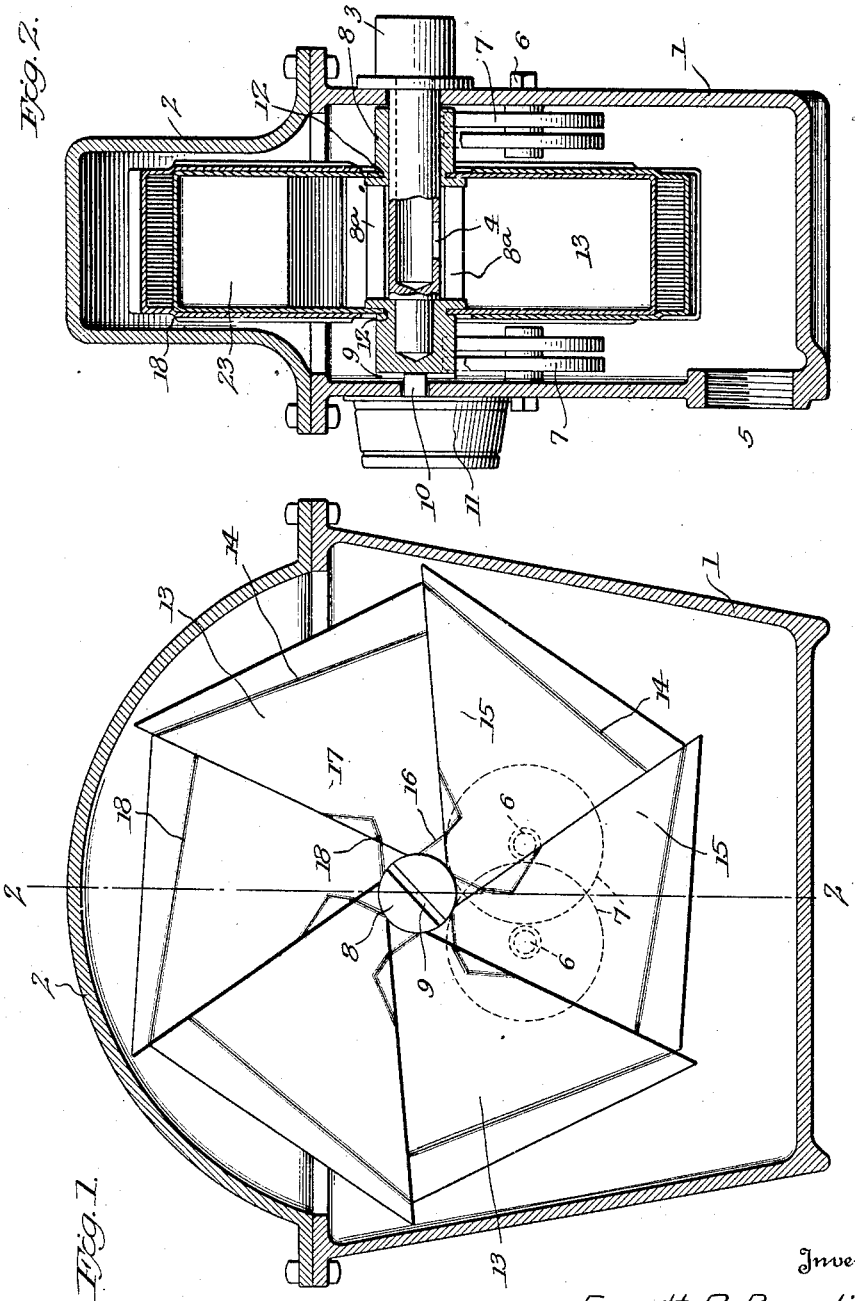

Inventor
Everett R. Benedict,
By
Attorney

Inventor
Everett R. Benedict,

Patented Nov. 15, 1927.

1,649,653

UNITED STATES PATENT OFFICE.

EVERETT R. BENEDICT, OF NORTH TONAWANDA, NEW YORK, ASSIGNOR TO AMERICAN DISTRICT STEAM COMPANY, OF NORTH TONAWANDA, NEW YORK, A CORPORATION OF NEW YORK.

METER.

Application filed September 30, 1924. Serial No. 740,858.

This invention relates to meters, particularly to those of the type shown in Eugene L. Barnes Patent No. 1,455,757, May 15, 1923.

It is contemplated among the objects of the invention, to provide a meter of this type having a casing which will be light but of great strength so as to successfully withstand rough usage in being connected up in the ordinary procedure of plumbing or steam fitting.

Still another object of the invention is to provide a device of this character wherein a rotor is mounted on bearings which are capable of withstanding usage under conditions where considerable moisture is present and considerable liability of being impaired by corrosion and the like.

Another object contemplated is the housing of a rotor in connection with a meter of this type, wherein the case is constructed to withstand operation under a vacuum and to provide easy access to the interior when so desired.

It is also contemplated to construct the rotor in such a manner that it will comprise a plurality of buckets or containers arranged around and carried by a rotatable spindle in such a way that liquid may be directed to the interior of the buckets through the spindle and an easy method provided for assembling and dis-assembling the buckets.

In devices of this kind, it is essential that absolute accuracy be maintained, even with a large range of temperature, vacuum, and different degrees of flow. In order to do this, it is necessary that the interior of the buckets be at all times free from sediment, corrosion, or other influences which might tend to throw the rotor out of balance. These, together with other objects and advantages of the present invention, will be partly evident and in part brought out more fully in the description which follows.

In the accompanying drawings, there is disclosed an embodiment of the invention illustrating its general principles, and wherein:

Figure 1 is a view in longitudinal vertical section through a meter casing, a rotor within the casing being shown in front elevation;

Fig. 2 is a view in transverse vertical section on the line 2—2 of Fig. 1;

Figure 3:
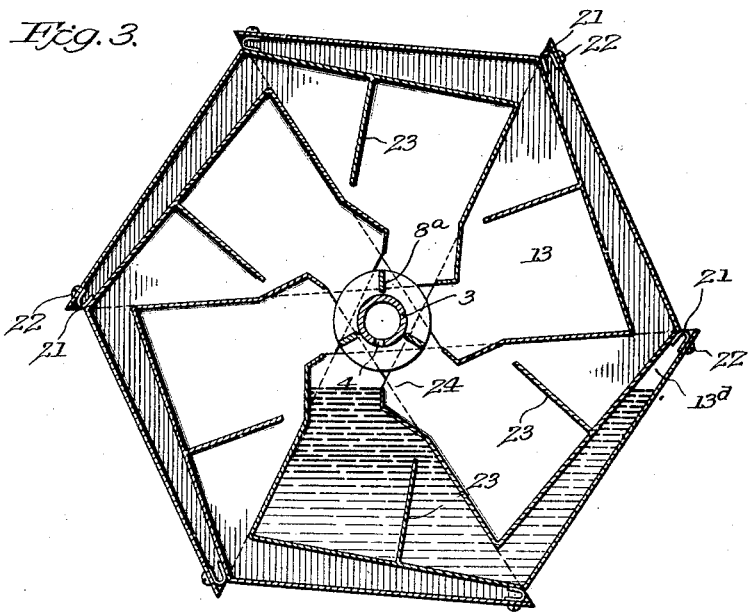
Fig. 3 is a similar view taken through the rotor, in assembled position.

In these drawings, the reference-character 1 designates the lower portion of a casing or housing. On this is mounted a detachable top portion 2, the connection between the portions being such that access to the interior may readily be accomplished and yet an air-tight joint be provided so that the structure may be successfully used in connection with a vacuum.

The casing is provided, centrally, with an opening in which a nipple 3 is secured and adapted to communicate with a pipe or the like (not shown) for introducing fluid into the interior of the casing. For this purpose the nipple has a portion which extends into the casing, and this extended portion is provided with an opening 4 through which liquid is adapted to be delivered to a rotor, presently to be described. An opening 5 in the casing is provided for the discharge of liquid therefrom and is threaded for the reception of a pipe or the like (not shown). Mounted on studs 6, in spaced-apart relation, at opposite portions of the casing are bearing members 7, in the form of disks, spaced apart to constitute a bearing of the grindstone type.

Mounted in these bearings is a spindle or shaft 8 comprising bearing engaging portions at its extremities, these being connected as by web-members $8^a$. The shaft, preferably and as shown, is bored centrally for the reception of the extended portions of the nipple 3, and freely rotates about this. At one end the spindle 8 is slotted as at 9 for connection with an actuating member 10 forming a part of a recording instrumentality, designated generally by the reference-character 11.

The spindle is circumferentially grooved, as at 12, for the reception of edge portions of containers or buckets, generally designated by the reference-character 13. These buckets are of peculiar and irregular form and are disposed in a definite and predetermined circular arrangement about the spindle, the desideratum being to form a rotor which includes a series of separable buckets and a spindle, all so disposed that a nice balance and placement will be maintained between any individual bucket and a line representing the mathematical center about which they are disposed.

Each bucket in this instance comprises two sides $13^a$—$13^a$, two end-sections $13^b$—$13^b$, and a base-portion $13^c$, all joined together to constitute a container which is closed on three sides and open on the fourth. Each side of the bucket is formed with an embossed or pressed-out portion 14, this including two angular walls 15 and 16. Also formed in the sides $13^a$ and in the embossed portions 14 thereof, is a supplemental embossed or pressed-out section 17. These embossed or pressed-out portions on the sides of each bucket are provided for the purpose of maintaining each individual bucket in a predetermined spaced relation to its companion bucket, when a series of these are nested together and assembled in position about the spindle 8, as shown in Figs. 1, 2 and 3, and whereby the companion buckets form a liquid-receiving and discharging structure. The embossed portions, or rather the walls thereof, provide for the definite positioning of the several buckets. Thus, the portions 19 and 20 which form one part of a bucket are adapted to be forced into and positioned by the corresponding embossed portions 14 on the next succeeding bucket of the series. The embossed portions 17 are for the accommodation and fitting of portions of the second bucket of the series. The walls of the embossed portions are so disposed with respect to the end wall of the bucket itself as to provide a space between the bottom of one bucket and the end wall of its companion bucket. In consequence, a space is provided which constitutes a spout or discharge outlet $13^d$ for liquid introduced into the bucket through the opening 4. The buckets are maintained in spaced relation one to the other by a U-shaped spacer 21, this being secured by a screw, rivet or the like 22. These provide means for securing the buckets together in a fixed position after they have been nested and assembled about the spindle.

Each bucket is provided with an internal partition or baffle-plate 23 which is disposed approximately perpendicular to the base $13^c$ of the bucket.

Figure 4:
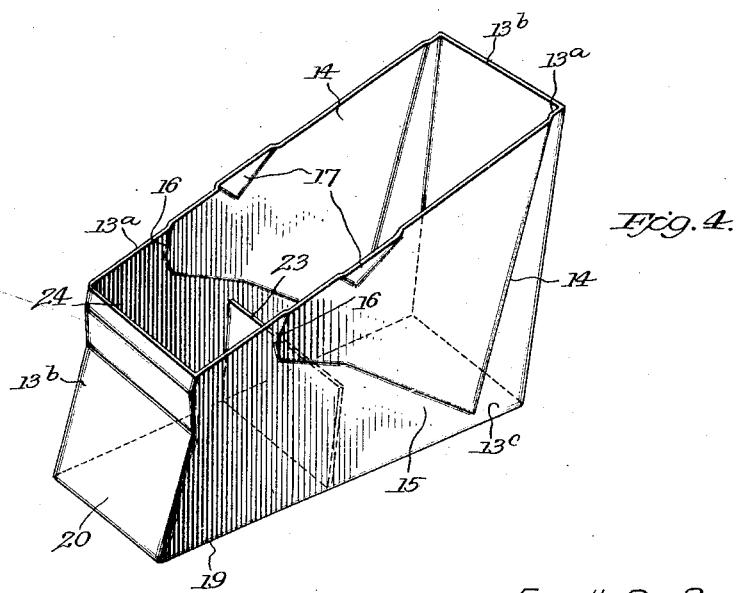
Fig. 4 is a view in perspective of a bucket or container constituting a portion of the rotor.

The inner wall $13^b$, as shown in Fig. 4, comprises an angulated wall, that is, a wall made up of a plurality of sections each of which extends at an angle to the plane of the adjacent section, in order to provide a section 24 which will be approximately perpendicular to the line of the incoming fluid and which operates accurately to cut off the flow of fluid from one bucket and to direct it into the next.

Figure 5:
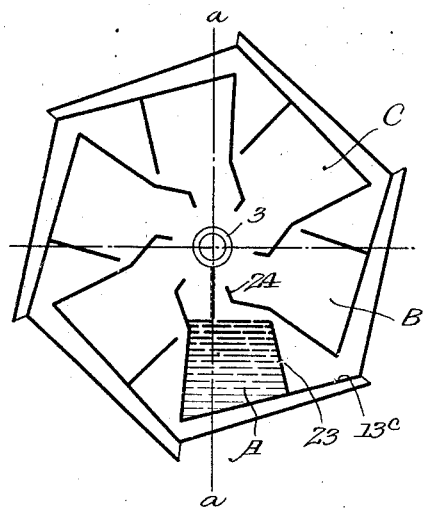
Figs. 5, 6 and 7 are diagrammatic views, showing successive positions of the rotor during the filling and discharge of one of the series of buckets constituting the rotor.
Figure 6:
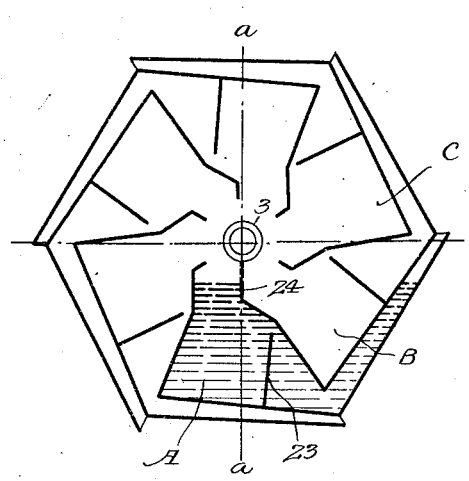
Figure 7:
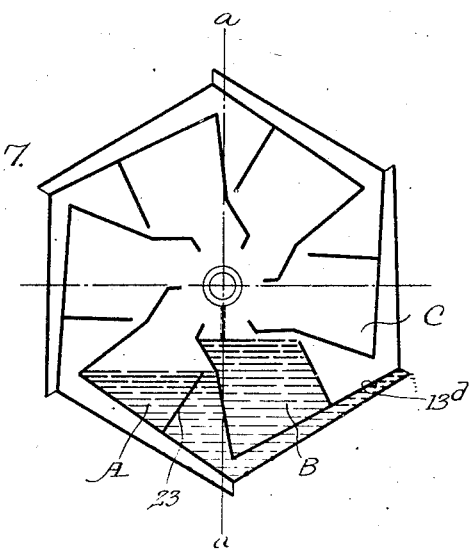

The operation of the device is shown diagrammatically in Figs. 5, 6 and 7. Fluid enters the nipple 3 and passes through it and out of the opening 4 into the interior of one of the buckets marked A, this being, as shown in Fig. 5, directly beneath the opening 4 in the nipple. The incoming fluid gradually and eventually fills this bucket, and by reason of the special shape of the bucket the greater portion of the fluid is caused to flow to one side of the perpendicular center line $a$—$a$ of the rotor (Figs. 3 and 6). In seeking to find the center of gravity, the fluid tends to turn the rotor until, when the bucket A is full, the weight and location of the fluid will have caused the bucket B to be positioned beneath the spout or opening of the nipple. This second bucket B in turn becomes filled and the fluid in it tends further to turn the rotor and thereby locate the bucket C into position to receive liquid from the nipple. During this action of the liquid and the consequent movement of the bucket, the liquid in the bucket A will begin to overflow the partition 23 and be discharged through the spout-like formation $13^d$ formed between the buckets A and B, as shown in Fig. 7. It will be noted that the bucket A does not begin to discharge its fluid until it has been filled to a point where it flows into the bucket B, the section 24 of the portion 20 being angulated to effect a cutting off of the fluid from the bucket A and to permit the flow of the fluid into the bucket B. In other words, the cut-off of the fluid from the bucket A is accomplished only when the cut-off portion 24 has entirely passed the perpendicular center line $a$—$a$ of the rotor. This insures absolute and accurate measuring by the device of the liquid introduced thereinto.

It will be understood that the shape of the rotor and the position of the baffle are such that liquid is prevented from surging and, consequently, the motion of the rotor is steady and continuous. In other words, the partition or baffle-plate effects a counterbalancing of the structure to prevent the rotor from spinning either from the action of the fluid or from gas in the buckets. As the contents of the bucket are known, and as a definite rotative movement of the bucket is effected by the contents, an accurate registering of the movement of the rotor is effected by the recording instrumentality connected therewith.

From the foregoing, it will be observed that the instrumentalities which constitute components of the structure are simple in construction, are readily assembled, and provide effective means for attaining the results sought. It is to be understood that my inventive-concept has in this instance been disclosed as a particular embodiment, that this is merely illustrative, and that the same is susceptible of a wide range of variation and modification without departing from the spirit of the invention or sacrificing any of the salient features or underlying principles thereof.

What I claim is:

1. A liquid measuring structure including a casing, a shaft having an axial bore and a radial discharge opening communicating with the bore, means whereby the shaft is rotatably mounted in the casing, a plurality of individual separable buckets disposed about the shaft in fluid communication with the discharge opening therein, said shaft being formed with means for detachably connecting the buckets to the shaft to constitute therewith a rotor.

2. A liquid measuring structure comprising a casing, a shaft having an axial bore and a radial discharge opening communicating with the bore, means whereby the shaft is rotatably mounted in the casing, a plurality of individual buckets disposed about the shaft in nested relation and each in direct fluid communication with the discharge opening therein, said shaft being formed with means for detachably connecting the buckets to the shaft to constitute therewith a rotor, and a nipple extending from the exterior of the casing into the bore of the shaft and having a fluid discharge opening in alinement with the opening in the shaft.

3. A liquid measuring structure including a casing, a shaft having an axial bore and a radial discharge opening communicating with the bore, means whereby the shaft is mounted in the casing, a plurality of individual buckets disposed about the shaft in nested relation and each in fluid communication with the discharge opening therein, said shaft being formed with means for detachably connecting the buckets to the shaft to constitute therewith a rotor, and a nipple extending from the exterior of the casing into the bore of the shaft and having a fluid discharge opening in alinement with the opening in the shaft, certain of the buckets including means for positioning other of the buckets of the series in definite relation thereto, said positioning means comprising embossed ridges on each bucket operating as a limit stop for edge portions of other buckets of the series forced into engagement therewith.

4. A liquid measuring structure comprising a casing having fluid inlet and outlet ports, a hollow member extending into the casing and having a liquid discharge, a shaft having an axial bore fitting over the member and a radial discharge opening communicating with the bore, means whereby the shaft is rotatably supported in the casing, and a plurality of buckets encompassing the shaft and open to register with the discharge opening, said shaft being formed with means for detachably mounting the buckets thereon.

5. A liquid measuring structure including a casing, a hollow member extending into the casing and having a liquid discharge, a shaft having an axial bore fitting over the member and a radial discharge opening communicating with the bore, means whereby the shaft is rotatably supported in the casing, a plurality of buckets encompassing the shaft and open to register with the discharge opening, said shaft being formed with means for detachably mounting the buckets thereabout, and means for locking the buckets to each other in assembled position.

6. A liquid measuring structure comprising a casing, a hollow member extending into the casing and having a liquid discharge, a shaft having an axial bore fitting over the member and a radial discharge opening communicating with the bore, means whereby the shaft is rotatably supported in the casing, a plurality of buckets encompassing the shaft and open to register with the discharge opening, said shaft being formed with grooves for receiving the edge portions of the buckets for detachably mounting the buckets thereon, means for locking the buckets in assembled position and including a member disposed on a portion of each bucket, and a fastening device for connecting the locking member with another bucket.

7. A meter including a casing provided with inlet and outlet openings; spaced bearings carried by the casing; a shaft rotatably mounted on the bearings and having an axial bore and a radial liquid discharge opening communicating with the bore; a nipple extending from the inlet opening into the bore and having an aperture in alinement with the discharge opening of the shaft; a series of buckets disposed around the shaft and having inner open sections registering with the discharge opening in the shaft; the shaft having means to detachably associate the buckets with the shaft to constitute a rotor entity; the series of buckets being so arranged that they are successively positioned in register with said aperture and filled with liquid therefrom to cause rotation of the shaft.

8. A meter comprising a casing provided with inlet and outlet openings; members in spaced apart relation mounted for rotation on opposite sides of the casing in proximity to the inlet opening and constituting bearings; a shaft rotatably mounted on the bearings and having an axial bore and a radial opening communicating with the bore; a hollow member, having a discharge opening, extending from the inlet opening into the bore of the shaft; and a series of buckets disposed around the shaft in nested relation with the walls of adjacent buckets defining in each bucket a fluid chamber of less volume than the volume of a bucket, each chamber having an open section registering with the discharge opening of the shaft; the shaft having means to detachably associate the buckets with the shaft to constitute a rotor entity.

9. A meter including a casing; bearings carried thereby; a hollow support rotatably mounted on the bearings and having a radial discharge opening; a plurality of individual buckets assembled in nested relation about the support whereby the walls of adjacent buckets define in each bucket a fluid chamber of less volume than the volume of a bucket and each chamber registers with the discharge opening of the support; the support having grooves into which portions of the buckets are fitted to detachably connect them to the support to constitute therewith a rotor; and means for conducting a fluid into the buckets through the support.

10. A meter including a casing; bearings carried thereby; a hollow support rotatably mounted on the bearings and having a radial discharge opening; a plurality of individual buckets assembled in nested relation about the support whereby the walls of adjacent buckets define in each bucket a fluid chamber of less volume than the volume of a bucket and each chamber registers with the discharge opening of the support; the support having means to detachably connect the buckets to the support to constitute therewith a rotor; a partition in each bucket extending from a portion thereof into spaced relation to the side of a proximate bucket; and means for conducting a fluid into the buckets through the support.

11. A meter including a casing; bearings carried thereby; a hollow support rotatably mounted on the bearings and having a radial discharge opening; a plurality of individual buckets assembled in nested relation about the support whereby the walls of adjacent buckets define in each bucket a fluid chamber of less volume than the volume of a bucket and each chamber registers with the discharge opening of the support; the support having means to detachably connect the buckets to the support to constitute therewith a rotor; a partition in each bucket extending from a portion thereof into spaced relation to the side of a proximate bucket; coacting means between adjacent buckets for maintaining them in spaced assembled relation; and means for conducting a fluid into the buckets through the support.

12. A meter including a casing; bearings carried thereby; a hollow support rotatably mounted on the bearings and having a radial discharge opening; a plurality of individual buckets assembled in nested relation about the support whereby the walls of adjacent buckets define in each bucket a fluid chamber of less volume than the volume of a bucket and each chamber registers with the discharge opening of the support; the support having grooves into which portions of the buckets are fitted to detachably connect them to the support to constitute therewith a rotor; a partition in each bucket extending from a portion thereof into spaced relation to the side of a proximate bucket; coacting means between adjacent buckets for maintaining them in spaced assembled relation; each of the buckets being formed with means for limiting the nesting of one bucket within another; and means for conducting a fluid into the buckets through the support.

13. A meter including a casing; bearings carried thereby; a hollow support rotatably mounted on the bearings and having a radial discharge opening; a plurality of individual buckets assembled in nested relation about the support whereby the walls of adjacent buckets defined in each bucket a fluid chamber of less volume than the volume of a bucket and each chamber registers with the discharge opening of the support; the support having means for detachably connecting the buckets to the support to constitute therewith a rotor; a partition in each bucket extending from a portion thereof into spaced relation to the side of a proximate bucket; coacting means between adjacent buckets for maintaining them in spaced assembled relation; each of the buckets being formed with means for limiting the nesting of one bucket within another, said means including embossed portions on one bucket formed to contact respectively with portions of two other buckets of the series; and means for conducting a fluid into the buckets through the support.

14. A rotor for a meter, comprising a hollow support having a radial opening communicating with the interior thereof, and a plurality of individual buckets nested around the support, said support and buckets being provided with interacting means to maintain the buckets detachably assembled with the support with a substantial portion of the open side of each bucket in direct fluid connection with said opening in the support.

15. A meter including a casing; bearings provided on opposite sides thereof; a rotor mounted on the bearings and comprising a hollow support having a radial fluid discharge opening communicating with the interior thereof, and a plurality of individual buckets nested around the support; said support and buckets being provided with interacting means to maintain the buckets detachably associated with the support; each bucket including side walls, end walls and a bottom and having one of its end walls angulated to another of the end walls to constitute a cut-off; and a baffle-plate extending at an angle from the bottom of each bucket.

16. A rotor for a fluid meter comprising a hollow shaft having a radial opening communicating with the interior thereof and a plurality of individual buckets nested about the shaft with a substantial part of their open sides facing the radial opening and in direct fluid communication therewith, the shaft and buckets being provided with interacting means to maintain them in assembled position on the shaft.

17. A rotor for a meter, comprising a hollow support having a radial opening communicating with the interior thereof and a plurality of individual buckets nested about the support with the walls of adjacent buckets defining in each bucket a fluid chamber of less volume than the volume of a bucket and each chamber registering with said opening.

18. A rotor for a meter, comprising a hollow support having a radial opening communicating with the interior thereof and a plurality of individual buckets nested about the support with the walls of adjacent buckets defining in each bucket a fluid chamber of less volume than the volume of a bucket and each chamber registering with said opening, said support and buckets being provided with interacting means to maintain the buckets detachably assembled with the support.

19. A rotor for a meter, comprising a hollow support having a radial opening communicating with the interior thereof and a plurality of individual buckets nested about the support with the walls of adjacent buckets defining in each bucket a fluid chamber of less volume than the volume of a bucket and each chamber registering with said opening, said support and buckets being provided with interacting means to maintain the buckets detachably assembled with the support, and each bucket being formed with means for limiting the nesting of others of the buckets therein.

20. A rotor for a meter, comprising a hollow support having a radial opening communicating with the interior thereof and a plurality of individual buckets nested about the support with the walls of adjacent buckets defining in each bucket a fluid chamber of less volume than the volume of a bucket and each chamber registering with said opening, said support and buckets being provided with interacting means to maintain the buckets detachably assembled with the support, and each bucket being formed with an angulated wall extending into a chamber to constitute a fluid cut-off and also with means for limiting the nesting of others of the buckets therein.

In testimony whereof I affix my signature.

EVERETT R. BENEDICT.